(12) United States Patent
DeBrebisson

(10) Patent No.: US 8,799,338 B2
(45) Date of Patent: Aug. 5, 2014

(54) AUTOMATIC PROMPT FOR INPUT DATA ON A CALCULATOR

(75) Inventor: Cyrille DeBrebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 576 days.

(21) Appl. No.: 13/119,478

(22) PCT Filed: Sep. 18, 2008

(86) PCT No.: PCT/US2008/076764
§ 371 (c)(1),
(2), (4) Date: Mar. 17, 2011

(87) PCT Pub. No.: WO2010/033117
PCT Pub. Date: Mar. 25, 2010

(65) Prior Publication Data
US 2011/0173242 A1    Jul. 14, 2011

(51) Int. Cl.
*G06F 3/02*    (2006.01)

(52) U.S. Cl.
USPC .......................................................... 708/167

(58) Field of Classification Search
None
See application file for complete search history.

(56) References Cited

U.S. PATENT DOCUMENTS

| | | | |
|---|---|---|---|
| 3,979,058 A | 9/1976 | Katz et al. | |
| 4,456,964 A * | 6/1984 | Olander, Jr. et al. | 708/167 |
| 5,313,396 A * | 5/1994 | Terpstra et al. | 701/538 |
| 6,167,412 A * | 12/2000 | Simons | 708/105 |
| 6,295,544 B1 * | 9/2001 | Cheung | 708/134 |
| 7,293,074 B1 * | 11/2007 | Jellinek et al. | 709/218 |
| 7,899,854 B1 * | 3/2011 | Fakharzadeh | 708/134 |
| 8,464,179 B2 * | 6/2013 | de Brebisson | 715/810 |
| 2002/0078107 A1 * | 6/2002 | Miller et al. | 708/131 |
| 2007/0219776 A1 * | 9/2007 | Gamon et al. | 704/9 |
| 2010/0030676 A1 * | 2/2010 | de Brebisson | 705/35 |
| 2010/0031172 A1 * | 2/2010 | de Brebisson | 715/764 |
| 2011/0173242 A1 * | 7/2011 | DeBrebisson | 708/131 |

FOREIGN PATENT DOCUMENTS

| | | |
|---|---|---|
| CN | 101128810 A | 2/2008 |
| TW | 200703063 A | 1/2007 |
| WO | WO-2006099878 | 9/2006 |

OTHER PUBLICATIONS

Hewlett-Packard Company, "HP 20b Business Consultant Financial Calculator 1-9 Manual," First edition, Aug. 2008, See p. 39-45 (Chapter 4. Cash Flows).
International Search Report, PCT/US2008/076764, Apr. 30, 2009.
Texas instruments Incorporated, "BA II Plus Professional Calculator," 2004. 1-9 See p. 40-51 (Chapter 3. Cash Flow Worksheet).
HPDC, Search Report dated Mar. 25, 2014, TW Pat. App. No. 98128792, 7 p.

* cited by examiner

*Primary Examiner* — David H Malzahn

(57) ABSTRACT

A calculator comprises a processor and a keyboard coupled to the processor. The keyboard comprises a calculation key that causes a calculation to be performed on input data. The calculator also comprises a display coupled to the processor. When the calculation key is pressed, the processor determines whether the input data has already been entered. If the input data has not already been input, the processor prompts a user of the calculator to enter the input data via the keyboard by displaying an alphanumeric description of the input data required for the calculation.

6 Claims, 4 Drawing Sheets

AUTOMATIC PROMPT FOR INPUT DATA ON A CALCULATOR

BACKGROUND

Various types of calculations (e.g., financial calculations) require multiple items of input data. A net present value calculation, for example, requires the cash flow values for each period and an investment interest rate as input values on which to base the calculation. A user will be troubled if the user wants to perform such a calculation but does not know how to provide the various input data values into the calculator. The user interface for a calculator is typically quite limited and often not helpful enough to many users.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
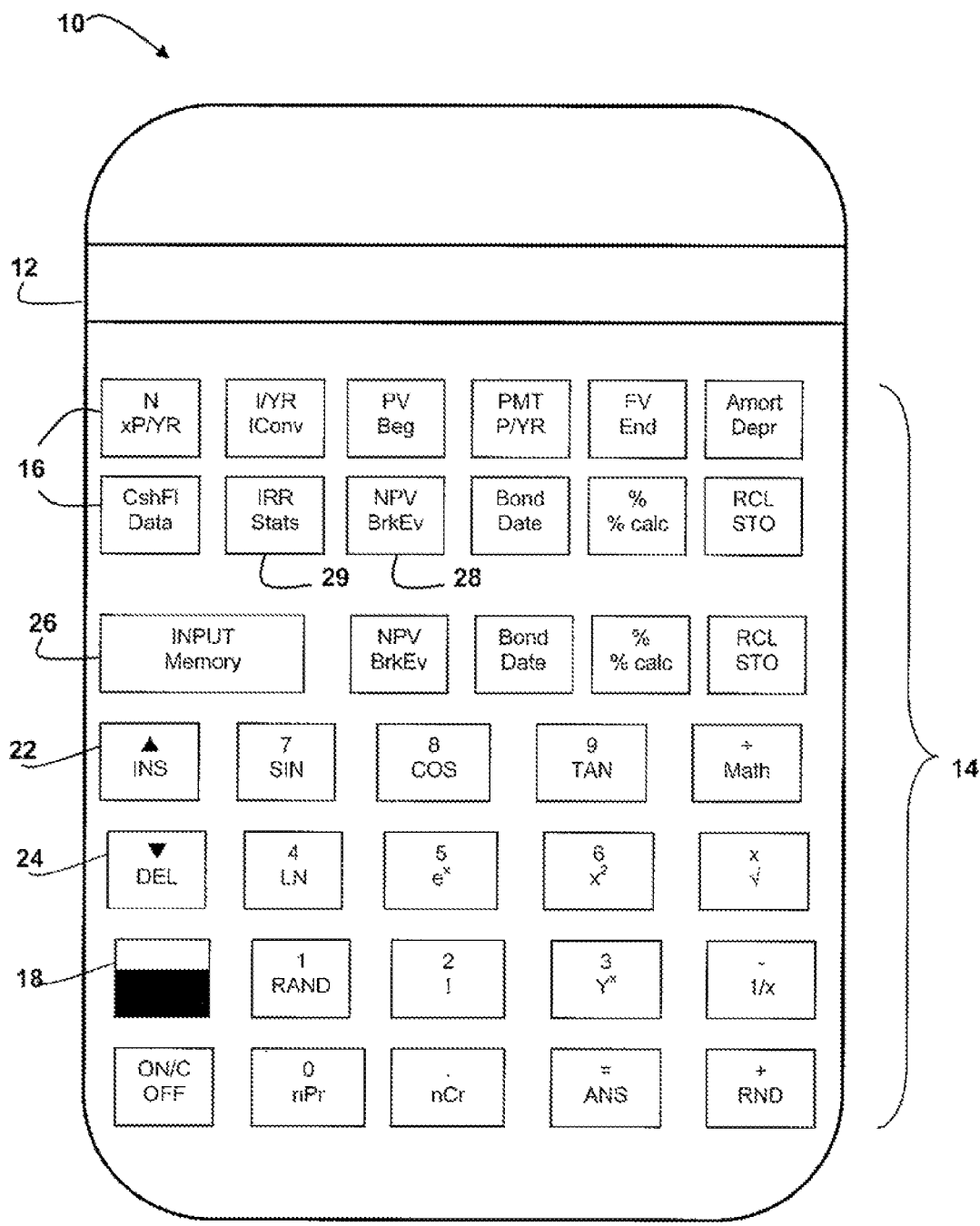
FIG. 1 a calculator in accordance with embodiments of the invention.

FIG. 1 shows an embodiment of an electronic computing system 10. In the embodiment shown, the electronic computing system 10 is a hand-held, battery-operated calculator and is referred to as a calculator in this disclosure. The calculator 10 comprises a display 12 and keyboard 14. In some embodiments, the display 10 is a 1 or 1.5 line display. A 1.5 line display means that one line is used for numbers as well as text and a second line is used for numbers only. The keyboard 14 includes multiple buttons 16, many of which have more than one function assigned thereto. Of the keyboard's buttons 16, the following buttons are discussed herein: shift button 18, up arrow button 22, down arrow button 24, input button 26, net present value (NPV) button 28, and statistics button (Stats) 29. The up and down arrow buttons 22, 24 comprise direction keys that permit a user to navigate up and down through a set of choices presented on the display 12. The terms "button" and "key" are used synonymously in this disclosure.

The shift button 18 is pressed to select the lower-most function of any of the buttons 16. If the statistics (Stats) function is desired on the Stats button 29, the shift button 18 is pressed first followed by the Stats button 29. If the shift button 18 is not pressed, then pressing the Stats button 29 (without pressing the shift button 18) selects the Internal Rate of Return (IRR) function.

Figure 2:
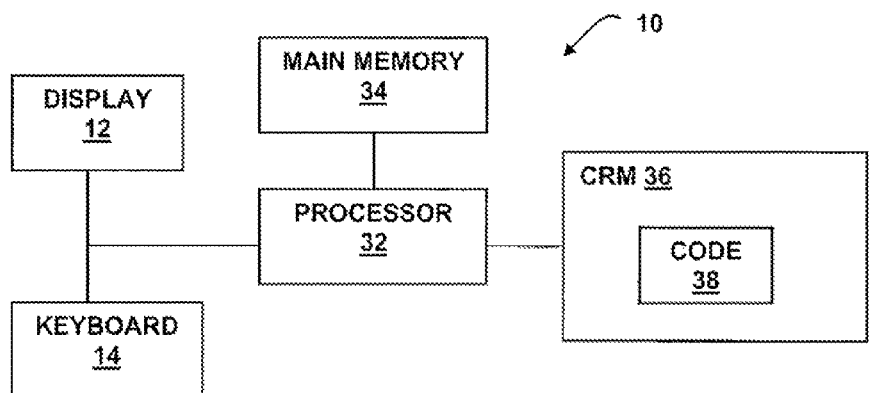
FIG. 2 shows a system block diagram of the calculator of FIG. 1.

FIG. 2 illustrates an electrical block diagram of the calculator 10. As shown, the calculator 10 comprises a processor 32 coupled to the display 12 and keyboard 14, as well as to main memory 34 and a computer-readable memory (CRM) 36. Code 38 is stored on the CRM 36 and is executed by processor 32. Some or all of the functionality described herein is implemented in code 38. The CRM 36 comprises volatile memory (e.g., random access memory), non-volatile storage (read-only memory (ROM)), hard disk drive, Flash memory, etc.), or combinations thereof.

In accordance with various embodiments, calculator 10 can perform various calculations that require input data and determine, when the user presses the button to perform the calculation, whether the user has already entered the required input data. If the user has entered the required input data, then the calculation is performed. If the user has not entered the required input data upon pressing the button to perform the calculation, the calculator 10 prompts the user to enter each item of required data for the calculation using easy to understand alphanumeric descriptions.

Figure 3:
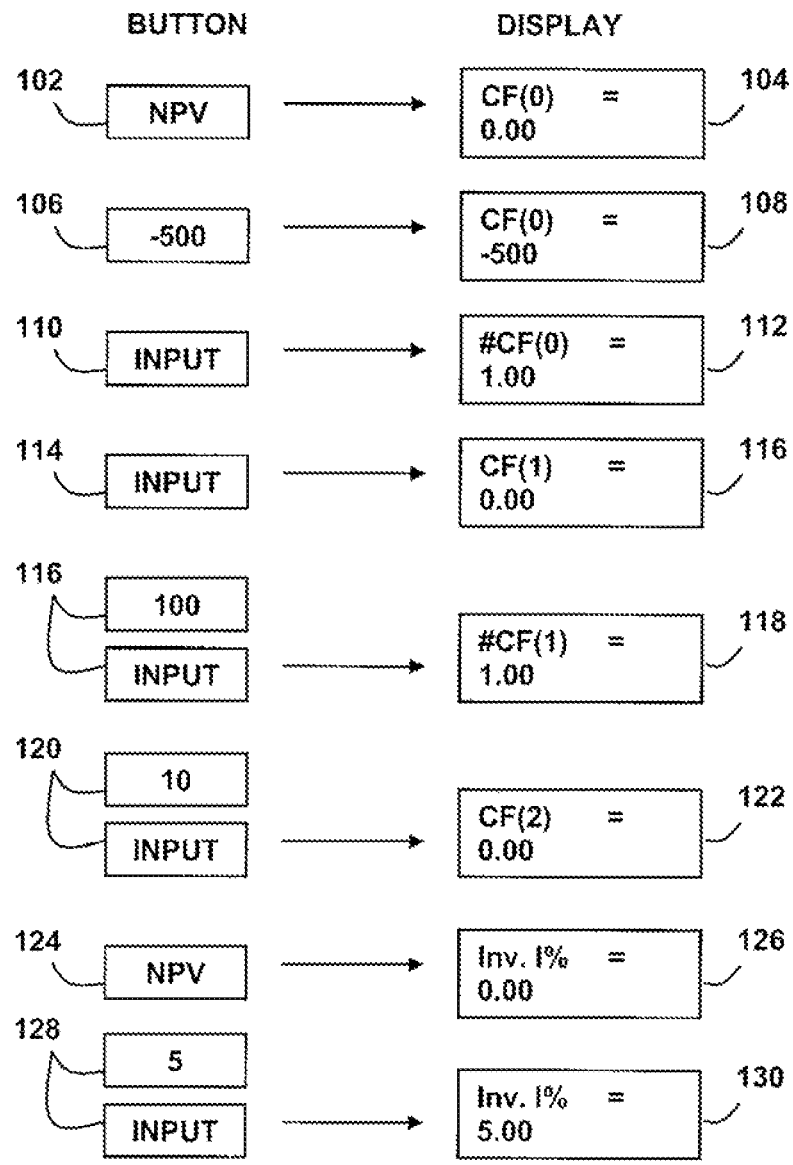
FIG. 3 identifies the buttons to press and the resulting display of the calculator in accordance with various embodiments as a calculation requiring multiple input values is performed.

FIG. 3 illustrates the above-described principle with respect to a net present value (NPV). A NPV calculation requires input data comprising one or more cash flows and an investment interest rate. If the user presses the NPV button 28 without having first entered any valid data for the NPV calculation, the calculator 10 transitions to a data entry mode (also called an area) to prompt the user for the required data without simply displaying an error message. In FIG. 3, the left-hand column illustrates the buttons that the user will press and the right-hand column shows what will be shown on display 12.

If the user has not already entered the required data, upon pressing the NPV button (shown at 102), the display will be as shown at 104 in which the user is prompted to enter the first cash flow (CF(0)) amount. The default value is 0.00 as shown but can be changed using the keyboard 14. At 106, the user enters a first cash flow amount of −500 which means 500 units of money (e.g., dollars) that is outgoing (money being invested by user). The display, at 108, shows that the CF(0) is now a value of −500. At 110, the user presses the INPUT button 26 which causes the −500 first cash flow to be accepted and the user to then be prompted for the number of times that first cash flow amount is to be spent/received (display defaults to a value of 1.00 meaning that CF(0) is spent only once. In the example of FIG. 3, the default value of 1.00 is accepted when the user again presses the INPUT button 26 at 114.

Referring still to FIG. 3, the display then at 116 prompts the user to enter the next cash flow amount (for CF(1)). The default cash flow amount is 0.00 but at 116 the user enters a replacement CF(1) value of 100 and presses the INPUT button 26. The calculator 10 accepts the CF(1) value of 100 and then prompts (118) the user to specify the number of times that the CF(1) value is to be spent/received. At 120, the user enter specifies a value of 10 for the number of times that CF(1) is to be spent/received.

The display, at 122, then prompts the user to enter a next cash flow value (CF(2)). This process can continue as desired by the user. In the example of FIG. 3, there are no more cash flow values and thus the user again presses the NPV button 26 as shown at 124. The user, at 126, is then prompted for the investment interest rate (Inv. I %) which defaults to a value of 0.00, but can be modified by the user. The user modifies (as shown at 128) the investment interest rate to a value of 5.00% (depicted at 130).

Figure 4:
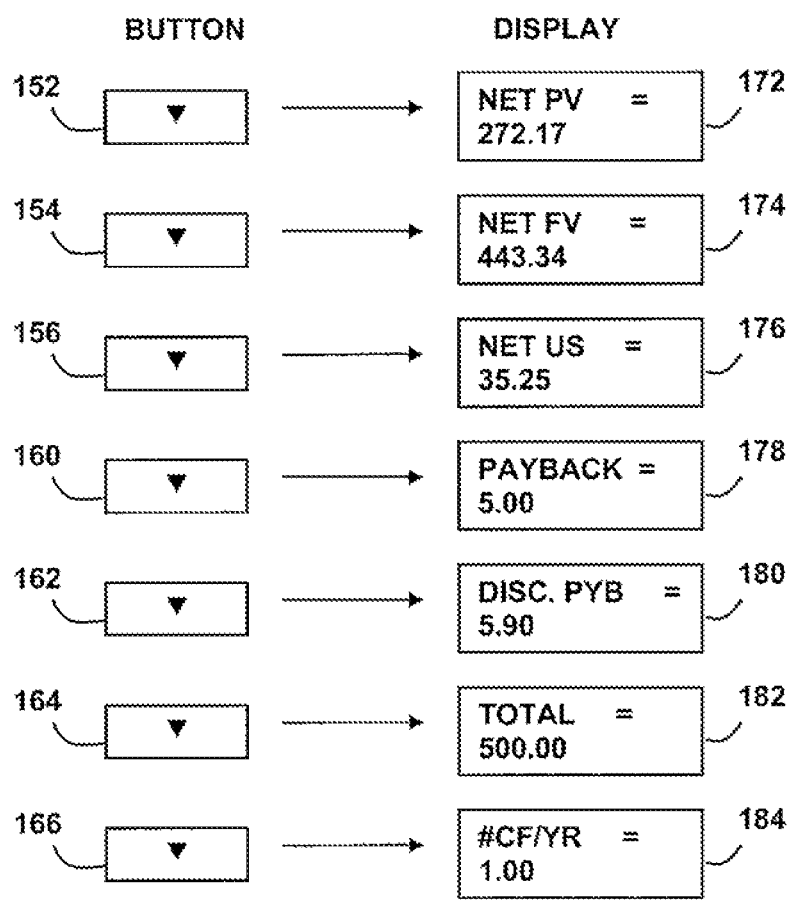
FIG. 4 identifies the buttons to press and the resulting display of the calculator in accordance with various embodiments as the results of the calculation are shown.

At this point, all of the data needed to perform a NPV calculation has been entered and the user need only scroll the results using the up or down arrow buttons 22, 24. FIG. 4 illustrates what the display as the user repeatedly presses the down arrow button 24. The down arrow button 24 is pressed as depicted at 152-166. Reference numerals depict what will be displayed on the display 12 of the calculator each time the user presses the down arrow button 24. Pressing the down arrow button advances the display downward in FIG. 4 and pressing the up arrow button forces the display to scroll in the opposite direction. The scrolling feature of the displays preferably loop back around to the beginning.

At 172, the net present value (PV) is shown—272.17 in the example of FIGS. 2 and 4. At 174, the net future value (FV) is shown. At 176, the net uniform series value is shown. At 178, the payback time period is shown. At 180, the discounted payback time period is shown. At 182 the total payment/receipt is shown, while at 184, the number of cash flow payments/receipts per year is shown.

Figure 5:
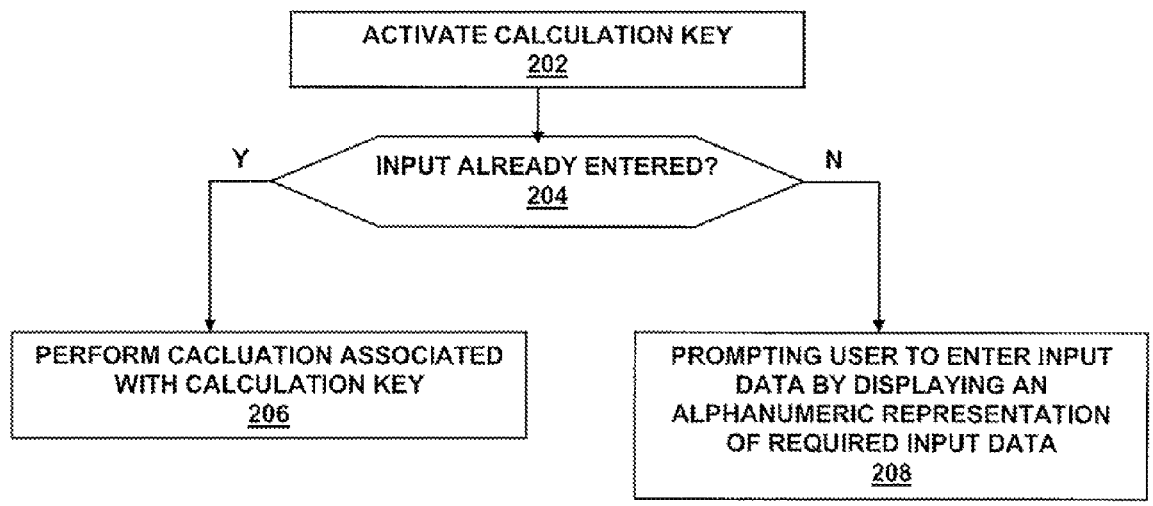
FIG. 5 shows a method in accordance with various embodiments.

FIG. 5 shows a method implemented on calculator 10. The method is preferably performed by the processor 32 executing code 38. At 202, the user activates a calculation key. Examples of such a calculation keys includes the NPV button 26 and Stats button 28. The calculation key is intended to cause a calculation to be performed on input data which may or may not have already been entered by the user. The calculation 10 determines at 204 whether the required input data has or has not already been entered. If the input data has been entered (e.g., the user may have already pressed the CshFl button to enter the data described above), then at 206 the calculator performs the calculation associated with the calculation button pressed in 202. On the other hand, if the user has not already entered the required input data, then at 208 the calculator automatically prompts the user to enter the input data by displaying an alphanumeric representation of the required input data on display 12. The alphanumeric representation is not an error message and instead is an easy to understand prompt that identifies for the user the specific data values that the user needs to enter as describe above.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A calculator, comprising:
   a processor;
   a keyboard coupled to the processor, said keyboard comprising a calculation key; the calculation key causing a calculation to be performed on input data; and
   a 1.5 line display coupled to the processor;
   wherein, when said calculation key is pressed, said processor determine whether said input data has already been entered and, if said input data has not already been input, said processor prompts a user of the calculator to enter said input data via said keyboard by then displaying an alphanumeric description of the input data required for the calculation.

2. The calculator of claim 1 wherein said alphanumeric description informs the user as to which input data the user must enter.

3. The calculator of claim 1 wherein said calculation is at least one of a net present (NPV) calculation, an internal rate of return (IRR) calculation and a statistics (STAT) calculation.

4. A method in a calculator, comprising:
   activating a calculation key on a calculator keyboard, the calculation key causing a calculation to be performed on input data;
   determining whether said input data has already been entered;
   if said input data has already been entered, performing said calculation using said input data; and
   if said input data has not already been input, prompting a user of the calculator to enter said input data via keyboard by displaying on a 1.5 line display an alphanumeric description of the input data required for the calculation.

5. The method of claim 4 further comprising performing a financial calculation using said input data after prompting the user to enter said input data and the user entering said input data.

6. The method of claim 4 wherein the calculation is at least one of a net present (NPV) calculation, an internal rate of return (IRR) calculation and a statistics (STAT) calculation.

* * * * *

UNITED STATES PATENT AND TRADEMARK OFFICE
CERTIFICATE OF CORRECTION

PATENT NO. : 8,799,338 B2  Page 1 of 1
APPLICATION NO. : 13/119478
DATED : August 5, 2014
INVENTOR(S) : Cyrille DeBrebisson It is certified that error appears in the above-identified patent and that said Letters Patent is hereby corrected as shown below:

In the Claims

In column 4, line 31, in Claim 3, delete "present" and insert -- present value --, therefor.

In column 4, line 51, in Claim 6, delete "present" and insert -- present value --, therefor.

Signed and Sealed this
Eighteenth Day of November, 2014

Michelle K. Lee
*Deputy Director of the United States Patent and Trademark Office*